(12) United States Patent
Wu

(10) Patent No.: US 11,528,549 B2
(45) Date of Patent: Dec. 13, 2022

(54) METHOD FOR IMPROVING ELECTRICAL ENDURANCE OF BATTERIES OF WIRELESS HEADPHONES AND THE WIRELESS HEADPHONES

(71) Applicant: Nanning FuLian FuGui Precision Industrial Co., Ltd., Nanning (CN)

(72) Inventor: Chun-Te Wu, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 0 days.

(21) Appl. No.: 17/564,603

(22) Filed: Dec. 29, 2021

(65) Prior Publication Data

US 2022/0124427 A1    Apr. 21, 2022

Related U.S. Application Data

(63) Continuation of application No. 17/138,298, filed on Dec. 30, 2020, now Pat. No. 11,265,642.

(30) Foreign Application Priority Data

Sep. 28, 2020    (CN) .......................... 202011043921.8

(51) Int. Cl.
| | | |
|---|---|---|
| *H04R 1/10* | (2006.01) | |
| *H04R 3/04* | (2006.01) | |
| *H04S 1/00* | (2006.01) | |
| *H04R 5/033* | (2006.01) | |
| *H02J 7/00* | (2006.01) | |
| *H04R 5/04* | (2006.01) | |

(52) U.S. Cl.
CPC .......... *H04R 1/1041* (2013.01); *H02J 7/0048* (2020.01); *H02J 7/0063* (2013.01); *H04R 3/04* (2013.01); *H04R 5/033* (2013.01); *H04R 5/04* (2013.01); *H04S 1/007* (2013.01); *H04R 2420/07* (2013.01); *H04R 2430/01* (2013.01); *H04S 2400/13* (2013.01)

(58) Field of Classification Search
CPC .... H04R 1/1041; H04R 5/033; H04R 5/0335; H04R 5/04; H04R 3/04; H04R 2420/07; H04S 1/007; H04S 1/005; H02J 7/0063; H02J 7/0048
USPC .......................... 381/309, 311, 74; 455/575.2
See application file for complete search history.

(56) References Cited

U.S. PATENT DOCUMENTS

| | | |
|---|---|---|
| 7,110,798 B2 | 9/2006 | Nassimi |
| 7,409,064 B2 | 8/2008 | Watanuki |
| 8,229,144 B2 | 7/2012 | Hsu et al. |

(Continued)

FOREIGN PATENT DOCUMENTS

| | | |
|---|---|---|
| CN | 108897516 A | 11/2018 |
| CN | 110618805 A | 12/2019 |

*Primary Examiner* — Xu Mei
(74) *Attorney, Agent, or Firm* — ScienBiziP, P.C.

(57) ABSTRACT

Wireless headphones with battery life effectively extended includes first and second headphones. The first and second headphones each with respective low battery levels remaining or very different battery levels remaining receive audio signals from an electronic device and output the sound of the audio signal after adjustments are applied to volume level and to sound quality on one side or on both sides, to reduce the consumption of battery level. Each of the first and second headphones carries a processor for intercommunication in addition to communication with the electronic device performing playback.

12 Claims, 3 Drawing Sheets

(56) References Cited

U.S. PATENT DOCUMENTS

| | | | |
|---|---|---|---|
| 9,025,789 B2* | 5/2015 | Yamkovoy | H04R 5/04 |
| | | | 381/74 |
| 9,578,410 B2 | 2/2017 | Ozawa et al. | |
| 9,913,022 B2* | 3/2018 | Dusan | H04R 1/1083 |
| 10,085,081 B2* | 9/2018 | Woo | H04R 1/1041 |
| 2010/0166208 A1 | 7/2010 | Kato | |
| 2013/0316642 A1* | 11/2013 | Newham | H04W 52/0206 |
| | | | 455/67.11 |
| 2014/0241553 A1 | 8/2014 | Tiscareno et al. | |
| 2015/0245129 A1* | 8/2015 | Dusan | G10L 21/0208 |
| | | | 381/71.6 |
| 2015/0281825 A1* | 10/2015 | Johnson | H04R 5/04 |
| | | | 381/74 |
| 2019/0020942 A1 | 1/2019 | Tang | |
| 2020/0304917 A1 | 9/2020 | Ryu | |
| 2021/0112327 A1* | 4/2021 | Lu | H04R 1/105 |

* cited by examiner

METHOD FOR IMPROVING ELECTRICAL ENDURANCE OF BATTERIES OF WIRELESS HEADPHONES AND THE WIRELESS HEADPHONES

CROSS-REFERENCE TO RELATED APPLICATIONS

The application is a continuation of and claims priority under 35 U.S.C. § 120 to U.S. application Ser. No. 17/138,298, filed Dec. 30, 2020, entitled "METHOD FOR IMPROVING ELECTRICAL ENDURANCE OF BATTERIES OF WIRELESS HEADPHONES AND THE WIRELESS HEADPHONES", which is hereby incorporated fully by reference herein.

FIELD

The present disclosure relates to wireless communications.

BACKGROUND

Wireless headphones which can provide stereo mode between the left and right ears and single ear listening mode are common. Since the left and right headphones each have their own battery, wireless communication module, and sound driver, the battery life of the two headphones may be different. If the user listens to music, the headphone with the shorter battery life will determine the length of time that the user can listen to music. In general, when the wireless headphones operate in binaural mode, the right headphone is usually used as the main headphone for communication with an electronic device actually performing the playback or other activity. Therefore, when the battery levels of the two headphones are the same, the right headphone will consume more power than the left headphone, and the battery life of the right headphone will be shorter than that of the left headphone. Extending the listening time of the headphones without affecting the user's listening experience is problematic.

BRIEF DESCRIPTION OF THE DRAWINGS

Implementations of the present technology will now be described, by way of example only, with reference to the attached figures, wherein.

DETAILED DESCRIPTION

Further areas of application will become apparent. It should be understood that the detailed description and specific examples, while indicating exemplary embodiments, are intended for purposes of illustration only and are not intended to limit the scope of the claims.

Figure 1:
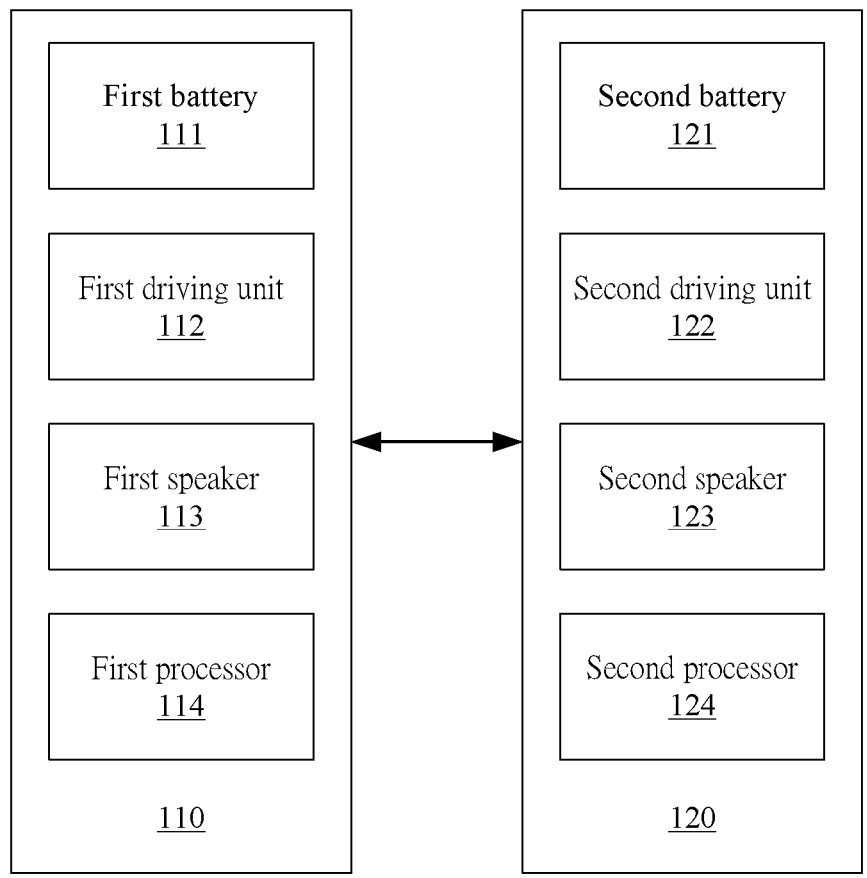
FIG. 1 is a block diagram of wireless headphones in accordance with an embodiment.

FIG. 1 is a block diagram of wireless headphones 100 in accordance with an embodiment. The set of wireless headphones 100 is composed of a first headphone 110 and a second headphone 120, and these can connect to at least one electronic device through WI-FI, BLUETOOTH, visible or invisible light communications, to receive audio signals. The audio signals output by the electronic device can be stereo audio, that is, different audio signals for right and left channels. In addition, the first headphone 110 and the second headphone 120 can be paired through BLUETOOTH for communicating between each other. The first headphone 110 includes at least a first battery 111 (such as a lithium battery), a first driving unit 112, a first speaker 113, and a first processor 114. The second headphone 120 includes at least a second battery 121 (such as the lithium battery), a second driving unit 122, a second speaker 123, and a second processor 124. The first driving unit 112 and the second driving unit 122 are at least composed of magnets, voice coils, and diaphragms, and make sounds through the first speaker 113 and the second speaker 123 according to the audio signals. In an example, the battery level of one of the first headphone 110 and the second headphone 120 may be less than the other and also lower than a first level threshold. Therein, the processor of the headphone with the less battery level can lower the output volume of that headphone and adjust sound quality of the audio signal received from the electronic device, to reduce power consumption. For example, when the first battery level of the first headphone 110 is less than the second battery level of the second headphone 120, and the first battery level is also lower than the first level threshold, the first processor 114 can lower the volume and adjust the sound quality of the first audio signal. On the other hand, when the second battery level of the second headphone 120 is less than the first battery level of the first headphone 110, and the second battery level is also lower than the first level threshold, the second processor 124 lowers the volume and adjusts the sound quality of the second audio signal received from the electronic device to reduce the power consumption of the second headphone 120.

It should be noted that when only one of the first headphone 110 and the second headphone 120 has the processor, the headphone with the processor is the main headphone. Since the main headphone is responsible for communicating with the electronic device, its power consumption must be greater than that of the slave headphone. Therefore, the processor will reduce the volume and adjust the sound quality of the audio signal played by the main headphone to increase the electrical endurance of the main headphone.

According to another embodiment, when the set of wireless headphone 100 connects to the electronic device, the processing unit of the electronic device (not shown in figures) obtains the data corresponding to the first battery level of the headphone first headphone 110 and the second battery level of the second headphone 120. However, in order to reduce the computing load of the first processor 114 or of the second processor 124, thereby reducing power consumption, after the processing unit of the electronic device determines that any one of the first battery level or the second battery level is lower than the first level threshold, the audio signal of the headphone with a lower battery level is processed, to reduce the volume and adjust the sound quality, and then the processing unit of the electronic device outputs the processed audio signal.

Figure 2:
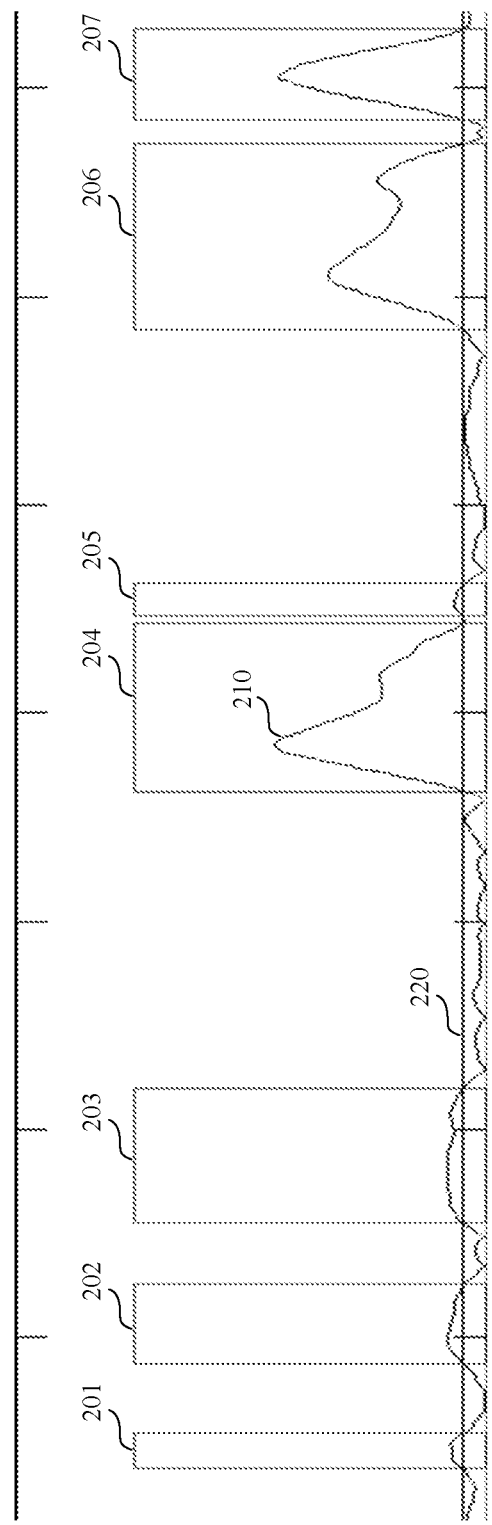
FIG. 2 is a schematic diagram of the segments to which the changes in volume and sound quality adjustments are applied, in accordance with an embodiment.

FIG. 2 is a schematic diagram of the segments to which changes in volume and sound quality are applied in accordance with an embodiment. In this embodiment, it is assumed that the first battery level of the first headphone 110 is lower than the second battery level of the second headphone 120. When the first battery level is lower than the first level threshold (e.g., 60%), the first processor 114 (or the processing unit of the electronic device) subtracts an absolute value of the first audio signal output to the first headphone 110 and an absolute value of the second audio signal output to the second headphone 120 to obtain a difference, and takes an absolute value of the obtained difference to obtain a first difference. Then, the first processor 114 (or the processing unit of the electronic device) selects the segments in which the first difference is greater than a preset threshold value over a predetermined time, and adjusts the volume corresponding to the segments. For example, as shown in FIG. 2, a curve 210 is the absolute value of the difference between the first audio signal and the second audio signal, a straight line 220 is the preset threshold value, and the segments 201-207 are the segments in which the absolute values are greater than the preset threshold. The greater the value of the difference, the greater is the difference between content of the two audio signals. By adjusting the volume of segments having the greater difference in content, an excessive inconsistency of the played sound is avoided. Then, as described above, the first processor 114 (or the processing unit of the electronic device) only selects the segments in which the first difference is greater than the preset threshold value over the predetermined time (e.g., 0.3 seconds). For example, if the predetermined time is set to 0.3 seconds, only the segments 203, 204, and 206 in FIG. 2 meet the condition, so the first processor 114 (or the processing unit of the electronic device) lowers the volume of the first audio signal corresponding to the segments 203, 204, and 206 by a first predetermined percentage (adjustment of the real-time domain) to reduce power consumption.

The first processor 114 (or the processing unit of the electronic device) further determines the magnitude of the first predetermined percentage according to the battery level difference between the two headphones. For example, when the battery level difference between the two headphones is less than 5%, the first processor 114 (or the processing unit of the electronic device) only lowers by 10% the volume of the audio signal of the right channel corresponding to the segments 203, 204, and 206. When the battery level difference of the two headphones is between 5-10%, the first processor 114 (or the processing unit of the electronic device) lowers by 20% the volume of the audio signal of the right channel corresponding to the segments 203, 204, and 206 and so on. In other words, the greater the battery level difference, the more the volume of the audio signal of the right headphone will be decreased, so as to greatly reduce the power consumption of the right headphone.

In addition, the first processor 114 (or the processing unit of the electronic device) can further adjust the sound quality of the remaining segments of the audio signal in which no volume adjustments are made (i.e., adjust frequency domain). For example, when the first battery level of the first headphone 110 is lower than the first battery 111 threshold (e.g. 60%) but higher than a second battery 121 threshold (e.g. 40%), the first processor 114 (or the processing unit of the electronic device) removes a second predetermined percentage of the high frequency energy of the right channel audio signal corresponding to the remaining segments. Similarly, the first processor 114 (or the processing unit of the electronic device) determines the second predetermined percentage according to the battery level difference of the two headphones. For example, when the battery level difference between the two headphones is less than 3%, the first processor 114 (or the processing unit of the electronic device) reduces by only 10% the high-frequency energy of the audio signal of the right channel corresponding to the remaining segments. When the battery level difference between the two headphones is between 3-6%, the first processor 114 (or the processing unit of the electronic device) reduces by 20% the high-frequency energy of the right channel audio signal corresponding to the remaining segments and so on. In other words, the greater the battery level difference, the more the high frequency energy of the first audio signal of the first headphone 110 is reduced.

Furthermore, when the first battery level of the first headphone 110 is lower than the second level threshold (e.g. 40%), the first processor 114 (or the processing unit of the electronic device) reduces the high frequency energy of the remaining segments of the first audio signal by a third predetermined percentage. Similarly, the first processor 114 (or the processing unit of the electronic device) also determines the third predetermined percentage according to the battery level difference between the two headphones. It should be noted that, since the first battery level of the first headphone 110 is already low, the third predetermined percentage will be greater than the second predetermined percentage under the same battery level difference. For example, when the battery level difference between the two headphones is less than 3%, the first processor 114 (or the processing unit of the electronic device) reduces by 15% the high-frequency energy of the remaining segments of the first audio signal. When the battery level difference between the two headphones is between 3-6%, the first processor 114 (or the processing unit of the electronic device) reduces by 30% the high-frequency energy of the remaining segments of the first audio signal and so on. Finally, after the first processor 114 (or the processing unit of the electronic device) adjusts the first audio signal, the adjusted first audio signal is output through the first speaker 113 of the first headphone 110, and the second speaker 123 of the second headphone 120 outputs the original second audio signal.

Figure 3:
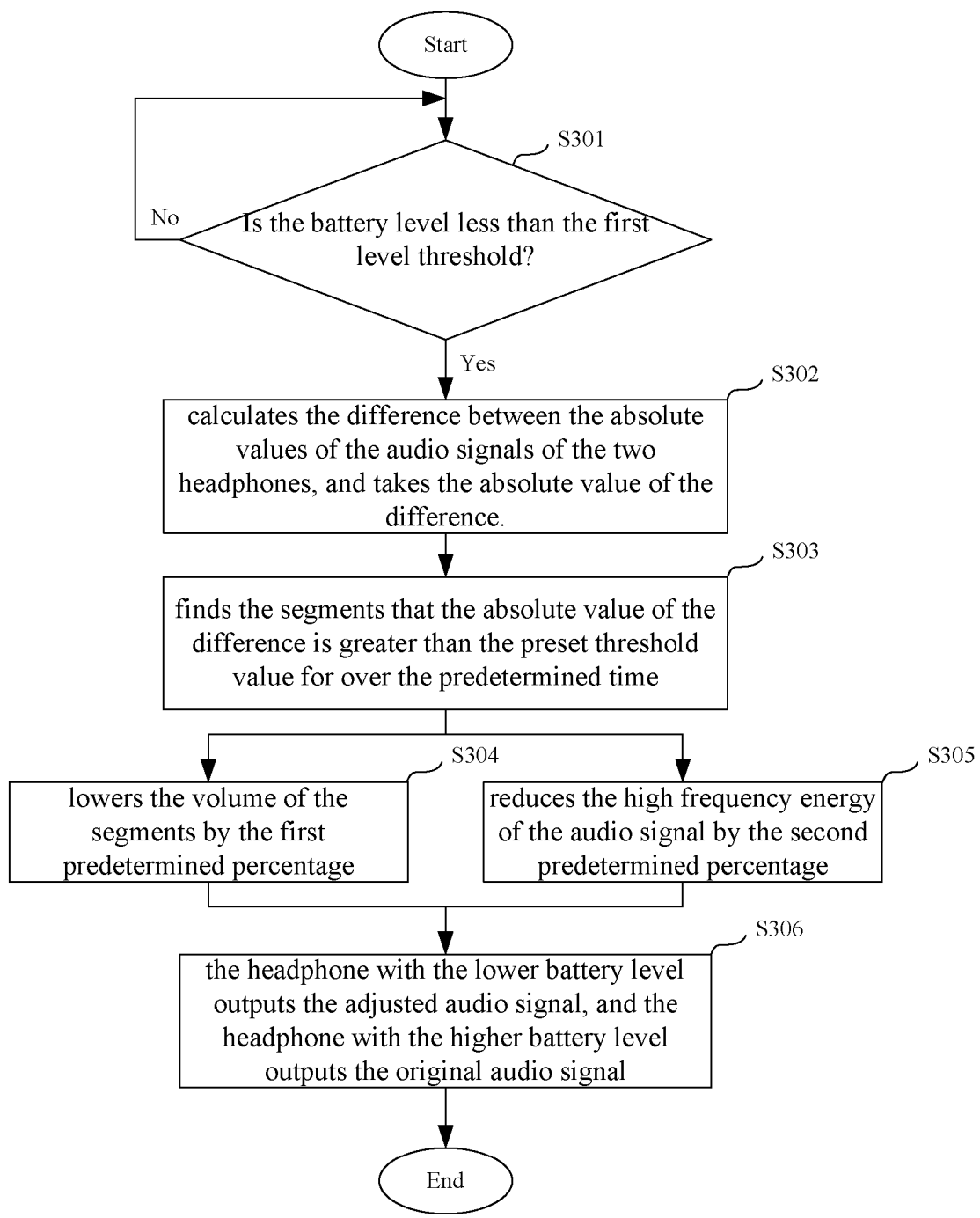
FIG. 3 is a flowchart of the method to improve electrical endurance of the wireless headphones in accordance with an embodiment.

FIG. 3 is the flowchart of the method to improve electrical or battery endurance of the set of the wireless headphones in accordance with an embodiment. The method adjusts the audio signal of the headphone with low power, and can be executed by the processing unit of the electronic device (hereinafter referred to as the processing unit) or by the processor of the headphone with low battery level (hereinafter referred to as the processor). The method includes the following steps:

At step S301, the processing unit or the processor determines whether the battery level of the headphone having a lower battery level is less than the first level threshold.

At step S302, when the battery level is less than the first level threshold, the processing unit or the processor calculates the difference between the absolute values of the audio signals of the two headphones, and takes the absolute value of the difference.

At step S303, the processing unit or the processor finds the segments in which the absolute value of the difference is greater than the preset threshold value over the predetermined time.

At step S304, the processing unit or the processor lowers the volume of the segments by the first predetermined percentage. Moreover, the processing unit or the processor further determines the number of the first predetermined percentage according to the battery level difference between the two headphones. For example, the greater the battery level difference, the more that the volume of the audio signal will be reduced, so as to greatly reduce the power consumption of headphones running with low power.

At step S305, for the audio signal in the remaining segments, the processing unit or the processor reduces the high frequency energy of the audio signal by the second predetermined percentage through the low-pass filter. Similarly, the processing unit or the processor determines the magnitude of the second predetermined percentage according to the battery level difference between the two headphones. For example, the greater the battery level difference, the more the high frequency energy of the audio signal is reduced.

It should be noted that since both step S304 and step S305 can effectively increase the endurance of the set of the wireless headphones, the user may choose to execute step S304 and step S305 at the same time (i.e. reduce the volume and adjust the sound quality at the same time) or execute just one of them.

At step S306, the processing unit or the processor generates the adjusted audio signal according to the adjustment as described. The headphone with the lower battery level outputs the adjusted audio signal, and the headphone with the higher battery level outputs the original audio signal.

Furthermore, the user can set the second battery level threshold, and when the battery level of the headphone with lower battery level is lower than the second battery level threshold, the processing unit or the processor reduces by the third predetermined percentage the high-frequency energy of the audio signal through the low-pass filter. It should be noted that since the battery level of the headphone is already low, the third predetermined percentage will be greater than the second predetermined percentage under the same battery level difference. For example, when the battery level difference between the two headphones is less than 3%, the processing unit or the processer reduces by 15% the high-frequency energy corresponding to the remaining segments of the audio signal. When the battery level difference between the two headphones is between 3-6%, the processing unit or the processer reduces by 30% the high-frequency energy corresponding to the remaining segments of the audio signal and so on. Similarly, after the processing unit or processor adjusts the audio signal, it outputs the adjusted audio signal through the speaker of the headphone with lower battery level, and the speaker of the headphone with higher battery level outputs the original audio signal.

It should be noted that although the method as described above has been described through a series of steps or blocks of a flowchart, the process is not limited to any order of the steps, and some steps may be different from the order of the remaining steps or the remaining steps can be done at the same time. In addition, those skilled in the art should understand that the steps shown in the flowchart are not exclusive, other steps may be included, or one or more steps may be deleted without departing from the scope.

In summary, according to the embodiments of the set of the wireless headphones and the method for improving the battery endurance of the set of the wireless headphones, when the battery level of the headphone is lower than the first level threshold, the power consumption of the headphone can be reduced by calculating the difference between the two audio signals, finding segments in which the difference is greater than the preset threshold value over the predetermined time, and adjusting the volume corresponding to the segments. In addition, for the remaining segments in which volume has not been adjusted, the sound quality can be adjusted to further extend the battery endurance, thereby enhancing the user experience.

It will be apparent to those skilled in the art that various modifications and variations can be made to the structure disclosed without departing from the scope or spirit of the claims. In view of the foregoing, it is intended that the present disclosure covers modifications and variations, provided they fall within the scope of the following claims and their equivalents.

What is claimed is:

1. A set of wireless headphones, comprising:
   a first headphone, having a first battery level, adapted for receiving a first audio signal from an electronic device, and outputting the first audio signal; and
   a second headphone, having a second battery level, adapted for receiving a second audio signal from the electronic device, and outputting the second audio signal,
   wherein the first headphone further comprising:
   a first processor configured for:
      obtaining a first absolute value of the first audio signal and a second absolute value of the second audio signal, and
      adjusting a volume of a part of the first audio signal and sound quality of the other part of the first audio signal according to the first absolute value and the second absolute value before outputting the first audio signal when determining the first battery level is less than the second battery level and the first battery level is less than a first level threshold.

2. The set of wireless headphones of claim 1, wherein the first processor is further configured for calculating a first difference between the first absolute value and the second absolute value.

3. The set of wireless headphones of claim 2, wherein the first processor selects segments in which the first difference is greater than a preset threshold value over a predetermined time and lowers the volume of the first audio signal corresponding to the segments by a first predetermined percentage to generate the adjusted first audio signal.

4. The set of wireless headphones of claim 3, wherein the first processor further adjusts the first predetermined percentage according to a second difference between the second battery level and the first battery level.

5. The set of wireless headphones of claim 3, wherein the first processor further selects the remaining segments in which the first difference is less than the preset threshold value or the first difference value is greater than the preset threshold value but does not continue over the predetermined time, and uses a low-pass filter to remove a second predetermined percentage of high-frequency energy of the first audio signal corresponding to the remaining segments to generate the adjusted first audio signal.

6. The set of wireless headphones of claim 5, wherein the first processor further adjusts the second predetermined percentage according to a second difference between the second battery level and the first battery level.

7. The set of wireless headphones of claim 5, wherein when the first battery level is less than a second battery level threshold, the first processor further applies the low-pass filter to remove a third predetermined percentage of the high-frequency energy of the first audio signal corresponding to the remaining segments to generate the adjusted first audio signal, wherein the third predetermined percentage is greater than the second predetermined percentage.

8. A method to improve endurance of a set of wireless headphones, wherein the wireless headphones comprises a first headphone having a first battery level and a second headphone having a second battery level, the method comprises the steps of:
   obtaining, by a processing unit of an electronic device, a first absolute value of a first audio signal and a second absolute value of a second audio signal;

adjusting, by the processor unit, a volume of a part of the first audio signal and sound quality of the other part of the first audio signal according to the first absolute value and the second absolute value when determining the first battery level is less than the second battery and the first battery level is less than a first level threshold outputting, by the electronic device, the adjusted first audio signal to the first headphone;

outputting, by the electronic device, the second audio signal to the second headphone.

9. The method of claim 8, further comprising:

calculating, by the processor unit, a first difference between the first absolute value and the second absolute value.

10. The method of claim 9, further comprising:

selecting, by the processor unit, segments in which the first difference is greater than a preset threshold value over a predetermined time; and decreasing, by the processor unit, the volume of the first audio signal-corresponding to the segments by a first predetermined percentage to generate the adjusted first audio signal.

11. The method of claim 9, further comprising:

adjusting, by the processor unit, the first predetermined percentage according to a second difference between the second battery level and the first battery level.

12. The method of claim 9, further comprising:

selecting, by the processor unit, remaining segments in which the first difference is less than the preset threshold value or the first difference value is greater than the preset threshold value but does not continue over the predetermined time; and applying a low-pass filter, by the processor unit, to remove a second predetermined percentage of high-frequency energy of the first audio signal corresponding to the remaining segments to generate the adjusted first audio signal.

* * * * *